US012104677B2

(12) United States Patent
Tanaka

(10) Patent No.: US 12,104,677 B2
(45) Date of Patent: Oct. 1, 2024

(54) RECIPROCAL MOVEMENT DEVICE

(71) Applicant: HI-LEX CORPORATION, Takarazuka (JP)

(72) Inventor: Shohei Tanaka, Hyogo (JP)

(73) Assignee: HI-LEX CORPORATION, Hyogo (JP)

( * ) Notice: Subject to any disclaimer, the term of this patent is extended or adjusted under 35 U.S.C. 154(b) by 0 days.

(21) Appl. No.: 18/009,351

(22) PCT Filed: Sep. 24, 2021

(86) PCT No.: PCT/JP2021/034927
§ 371 (c)(1),
(2) Date: Dec. 9, 2022

(87) PCT Pub. No.: WO2022/065396
PCT Pub. Date: Mar. 31, 2022

(65) Prior Publication Data
US 2023/0341032 A1    Oct. 26, 2023

(30) Foreign Application Priority Data

Sep. 24, 2020   (JP) .................................. 2020-159888

(51) Int. Cl.
*F16H 25/12*     (2006.01)
*B60K 15/05*     (2006.01)
*E05F 15/616*    (2015.01)

(52) U.S. Cl.
CPC ............ *F16H 25/125* (2013.01); *B60K 15/05* (2013.01); *B60K 2015/0515* (2013.01);
(Continued)

(58) Field of Classification Search
CPC ...... F16H 25/125; E05F 15/616; B60K 15/05; B60K 2015/0515; E05Y 2201/638; E05Y 2900/534
See application file for complete search history.

(56) References Cited

U.S. PATENT DOCUMENTS

| 2019/0093392 A1* | 3/2019 | Schwab ................. E05B 81/06 |
| 2020/0123817 A1 | 4/2020 | Inose et al. |
| 2021/0246695 A1 | 8/2021 | Kuwayama et al. |

FOREIGN PATENT DOCUMENTS

| JP | 2019-011601 | 1/2019 |
| JP | 2020-029744 | 2/2020 |
| WO | WO-2020007737 A1 * | 1/2020 ......... B60K 15/0406 |

OTHER PUBLICATIONS

International Search Report and Written Opinion for International Application No. PCT/JP2021/034927 mailed on Oct. 19, 2021, 9 pages.

* cited by examiner

*Primary Examiner* — Terence Boes
(74) *Attorney, Agent, or Firm* — Amin, Turocy & Watson, LLP

(57) ABSTRACT

A forward/backward movement device includes: a case; a guide member that is housed in the case and includes a shaft and a protrusion formed on an outer peripheral surface of the shaft; and a forward/backward movement member having a cylindrical shape. The forward/backward movement member includes a groove that is formed on an inner peripheral surface of the forward/backward movement member and moves forward and backward with respect to the case while rotating by being guided by the protrusion. The groove is a portion where the protrusion slides. Thereby the forward/backward movement device can be miniaturized while preventing the intrusion of water.

6 Claims, 5 Drawing Sheets

(52) U.S. Cl.
    CPC ....... *E05F 15/616* (2015.01); *E05Y 2201/638* (2013.01); *E05Y 2900/534* (2013.01)

RECIPROCAL MOVEMENT DEVICE

TECHNICAL FIELD

The present invention relates to a forward/backward movement device.

BACKGROUND ART

Patent Literature (hereinafter, referred to as PLT) 1 discloses a forward/backward movement device capable of being miniaturized. The forward/backward movement device of PTL 1 includes: a case; a forward/backward movement member that includes an outer peripheral surface on which a helical groove is formed and that moves forward and backward with respect to the case; a forward/backward movement member-side member that rotatably holds the forward/backward movement member and moves in the axial direction of the forward/backward movement member together with the forward/backward movement member; and a protrusion that is formed inside the case and fits to the helical groove of the forward/backward movement member.

In the outer peripheral surface of the above-described forward/backward movement member, the helical groove is formed in an area that is adjacent to the forward/backward movement member-side member and is not exposed to the outside of the case. On the other hand, the helical groove, which can be an intrusion passage of water, is not formed in an area exposed to the outside of the case. This can prevent the intrusion of water from the outside of the case to the inside of the case.

CITATION LIST

Patent Literature

PTL 1
   Japanese Patent Application Laid-Open No. 2019-11601

SUMMARY OF INVENTION

Technical Problem

However, in the conventional art of PTL 1, the length of the forward/backward movement member is a length resulting from addition of the area where the helical groove is formed and the area where the helical groove is not formed in the extending direction of the forward/backward movement member. Demand for miniaturization of the forward/backward movement device has been recently increasing and thus how the forward/backward movement device can be miniaturized while preventing intrusion of water is important.

An object of the present invention is to provide a forward/backward movement device capable of being miniaturized while preventing intrusion of water.

Solution to Problem

A forward/backward movement device of the present invention includes: a case; a guide member that is housed in the case and includes a shaft and a protrusion formed on an outer peripheral surface of the shaft; and a forward/backward movement member having a cylindrical shape, the forward/backward movement member including a groove that is formed on an inner peripheral surface of the forward/backward movement member and moving forward and backward with respect to the case while rotating by being guided by the protrusion, the groove being a portion where the protrusion slides.

Advantageous Effects of Invention

According to the present invention, it is possible to realize a forward/backward movement device capable of being miniaturized while preventing intrusion of water.

DESCRIPTION OF EMBODIMENTS

Hereinafter, an embodiment of the present invention will be described in detail with reference to the drawings.

Figure 1:
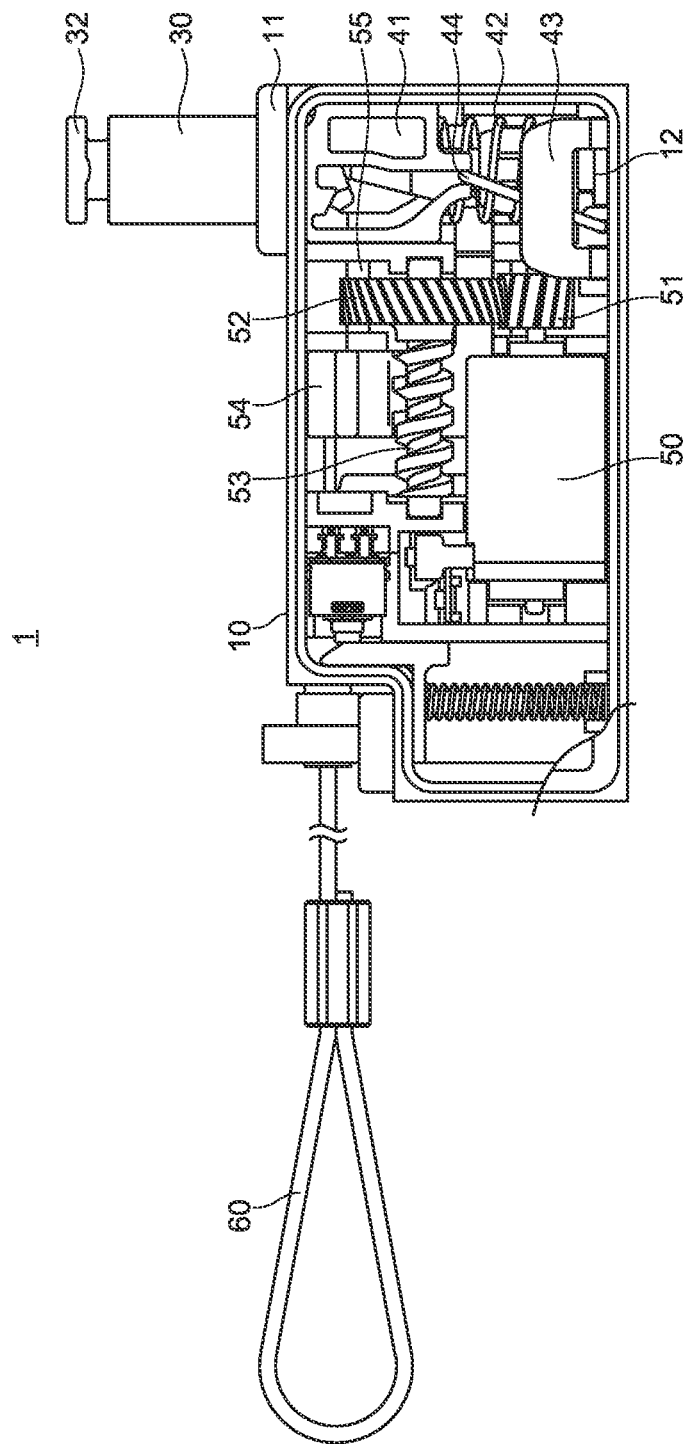
FIG. 1 illustrates an exemplary configuration of forward/backward movement device 1 according to an embodiment of the present invention.
Figure 2:
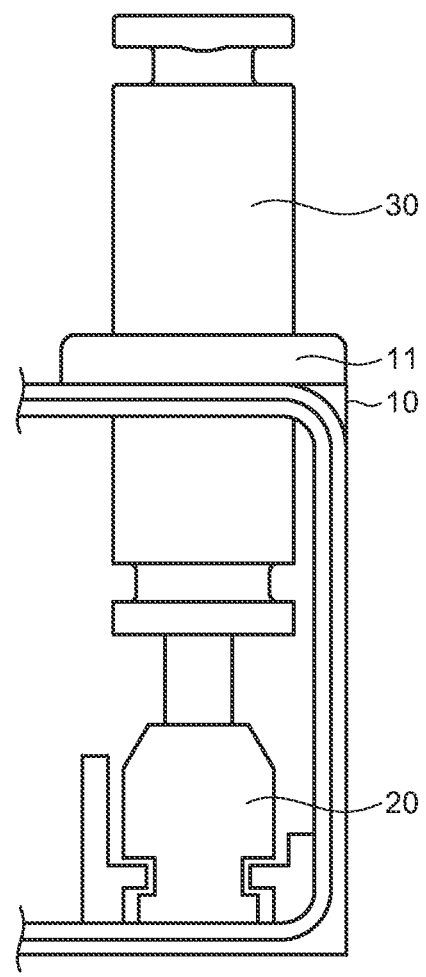
FIG. 2 is an enlarged view of a portion of forward/backward movement device 1.
Figure 3:
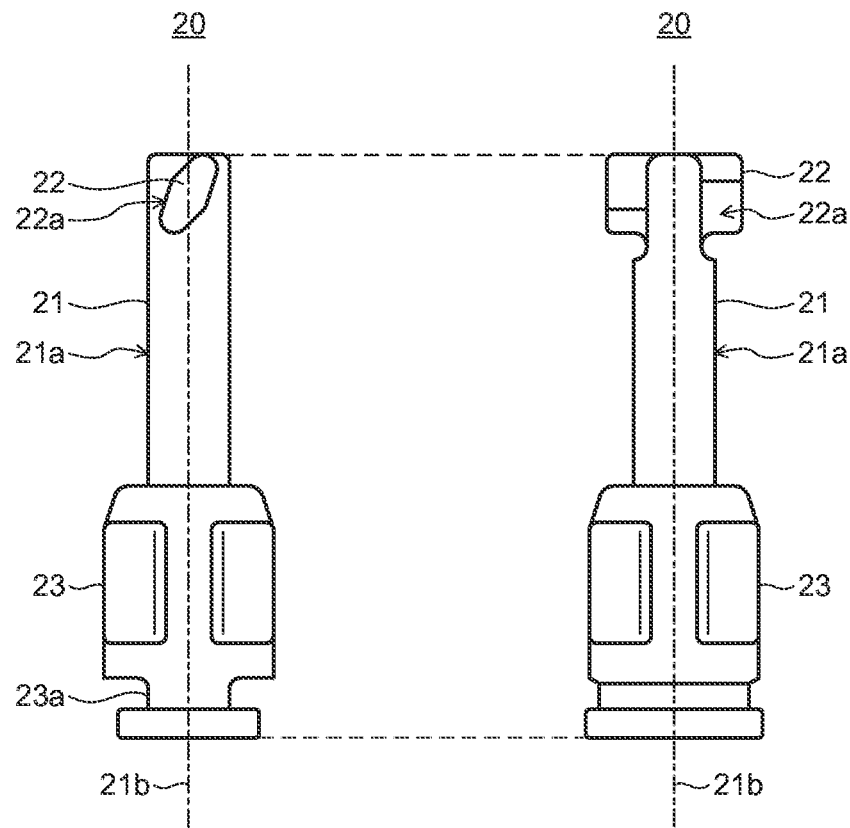
FIG. 3 illustrates an exemplary configuration of guide member 20.
Figure 4:
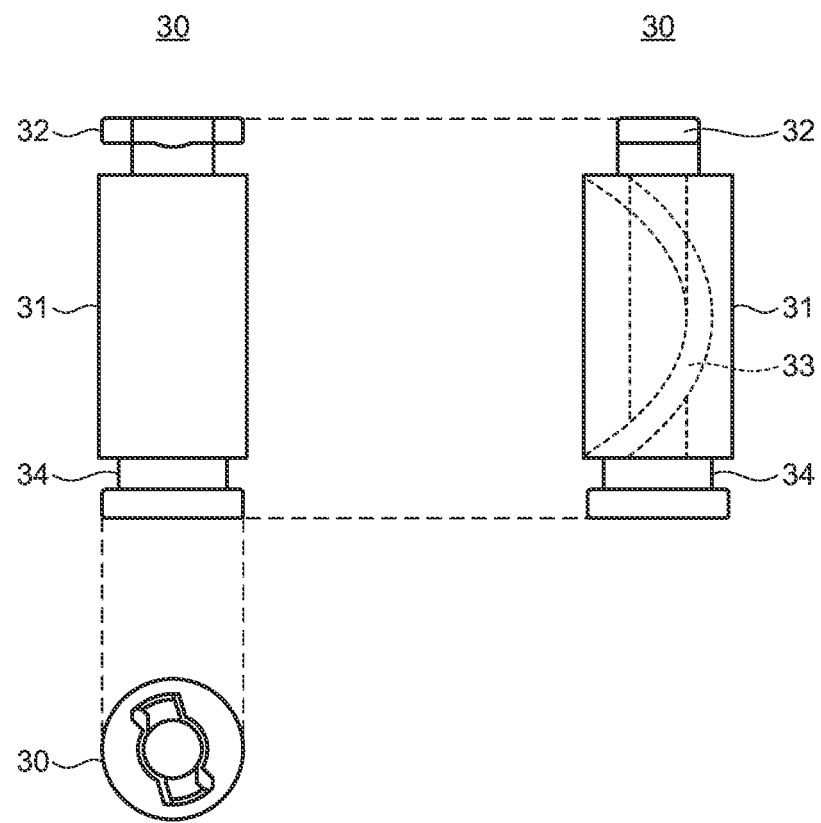
FIG. 4 illustrates an exemplary configuration of forward/backward movement member 30.

FIG. 1 illustrates an exemplary configuration of forward/backward movement device 1 according to an embodiment of the present invention. FIG. 2 is an enlarged view of a portion of forward/backward movement device 1. FIG. 3 illustrates an exemplary configuration of guide member 20. FIG. 4 illustrates an exemplary configuration of forward/backward movement member 30.

A diagram of FIG. 3 on the left side is a diagram of guide member 20 viewed from the side, and a diagram of FIG. 3 on the right side is a diagram of guide member 20 viewed from the front. A diagram of FIG. 4 on the left side is a diagram of forward/backward movement member 30 viewed from the side, a diagram of FIG. 4 on the right side is a diagram of forward/backward movement member 30 viewed from the front, and a diagram of FIG. 4 on the lower side is a diagram of forward/backward movement member 30 viewed from the lower end.

Forward/backward movement device 1 is applied to, for example, an opening and closing device that opens and closes a lid (fuel lid) of an opening where a filler port of a vehicle is housed.

Forward/backward movement device 1 includes case 10, seal cover 11, screw guide 12, guide member 20, forward/backward movement member 30 having a cylindrical shape, cam 41, spring 42, spring plate 43, and guide pin 44.

Further, forward/backward movement device 1 includes motor 50, first gear 51, second gear 52, third gear 53, rack gear 54, lock portion 55, and cable 60.

As illustrated in FIG. 3, guide member 20 includes shaft 21 inserted into forward/backward movement member 30 with central axis 21b disposed coaxially with forward/backward movement member 30 (see FIG. 4), protrusion 22 formed on outer peripheral surface 21a of shaft 21, and fixing member 23 fixing shaft 21.

Two protrusions 22 are formed on shaft 21, for example. Two protrusions 22 are arranged, for example, line-symmetrically with respect to central axis 21b of shaft 21.

Protrusions 22 each include, for example, inclined surface 22a inclined at a predetermined angle with respect to the extending direction of central axis 21b of shaft 21. The predetermined angle is set so that protrusion 22 fits to and slides along groove 33 (see FIG. 4) having a helical shape and formed in forward/backward movement member 30 and so that an appropriate backlash is formed between protrusion 22 and groove 33. Inclined surface 22a is a surface inclined parallel to the inner peripheral surface forming groove 33, for example.

Groove 23a having an annular shape is formed in a portion of fixing member 23 adjacent to the lower end. Groove 23a of fixing member 23 is fitted into screw guide 12 (see FIG. 1), so that guide member 20 is fixed to the inside of case 10.

Further, as illustrated in FIG. 4, forward/backward movement member 30 is a cylindrical member that moves forward and backward with respect to case 10.

Forward/backward movement member 30 moves between a forward position where forward/backward movement member 30 has moved forward and a backward position where forward/backward movement member 30 has moved backward. The forward movement is a movement from the inside of case 10 toward the outside where the fuel lid is present, and the forward position is a stop position of forward/backward movement member 30 moving forward. Further, the forward position is a position where latching section 32 of forward/backward movement member 30 is in an unlatched state from a latched section of the fuel lid and the fuel lid is in an opened state.

On the other hand, the backward movement is a movement from the outside of case 10 toward the inside of case 10, and the backward position is a stop position of forward/backward movement member 30 moving backward. Further, the backward position is a position where latching section 32 is in a latched state with the latched section of the fuel lid and thus the fuel lid is held in a closed state.

The latched section of the fuel lid includes an opening for latching latching section 32 of forward/backward movement member 30. When the rotation angle of latching section 32 of forward/backward movement member 30 is set to a first angle, the latching of latching section 32 to the latched section is released. When the rotation angle is set to a second angle, latching section 32 is latched to the latched section.

Specifically, when the rotation angle of latching section 32 is set to the first angle, latching section 32 passes through the opening of the latched section. Then, after latching section 32 passes through the opening, the rotation angle of latching section 32 is set to the second angle, thus latching section 32 is latched to the latched section, and the fuel lid is locked by lock portion 55 while in the closed state.

Further, due to the opening operation of the fuel lid, forward/backward movement member 30 moves forward by the repulsive force of spring 42. In this process, the rotation angle of latching section 32 is set to the first angle, so that the latching of latching section 32 is released. Then, latching section 32 passes through the opening of the latched section, and thus the fuel lid is in the opened state.

The second angle is, for example, an angle at which the rotation angle of latching section 32 of forward/backward movement member 30 is changed to, for example, 90° from the first angle.

Forward/backward movement member 30 includes body 31, latching section 32 formed at an upper end of body 31, groove 33 formed on an inner peripheral surface of body 31, and groove 34 having an annular shape and formed in the outer peripheral surface of body 31 at a portion adjacent to the lower end of body 31.

Groove 33 is a helical groove extending from the lower end (one end) toward the upper end (another end) of body 31. Note that it is preferred that groove 33 is a groove having a shape extending from the lower end (one end) to a position reaching the upper end (the other end) of body 31. Thus, the total length of forward/backward movement member 30 exposed from seal cover 11 of case 10 can be shorter when forward/backward movement member 30 moves backward.

Forward/backward movement member 30 configured as described above is inserted into a through hole surrounded by seal cover 11 of case 10. Seal cover 11 is a waterproof cover for preventing water from entering through a gap between case 10 and forward/backward movement member 30.

Shaft 21 of guide member 20 illustrated in FIG. 3 is inserted into a space inside forward/backward movement member 30. Protrusion 22 formed on shaft 21 of guide member 20 and groove 33 of forward/backward movement member 30 constitute a mechanism of moving forward/backward movement member 30 forward and backward while rotating forward/backward movement member 30.

Groove 33 that protrusion 22 slides onto is formed in the inner peripheral surface of forward/backward movement member 30, and forward/backward movement member 30 is guided by protrusion 22, so that forward/backward movement member 30 rotates and moves forward and backward with respect to case 10.

Further, a protrusion (not illustrated) formed, for example, on cam 41 illustrated in FIG. 1 is fitted into groove 34. The protrusion is a member for rotatably holding forward/backward movement member 30 in cam 41.

Cam 41 and spring 42 constitute a mechanism of moving forward/backward movement member 30 in the forward and backward direction.

Cam 41 is disposed inside case 10 so that cam 41 can move in the same direction as the moving direction (moving forward and backward direction) of forward/backward movement member 30 while rotatably holding forward/backward movement member 30.

Guide pin 44, which is a wire for limiting a range of forward and backward movement of cam 41 to a predetermined range, is latched to cam 41.

For example, when the fuel lid is closed, forward/backward movement member 30 pressed by the fuel lid moves toward the inside of case 10, so that spring 42 connected to cam 41 is compressed by cam 41 holding forward/backward movement member 30.

Further, when the fuel lid is opened, spring 42 that has been compressed extends, and cam 41 is pushed out, so that forward/backward movement member 30 held by cam 41 moves forwards.

Motor 50 is housed in case 10. First gear 51 is fixed to a drive shaft of motor 50.

Second gear 52, which is a driven gear rotatably supported by case 10, is engaged with first gear 51.

Third gear 53, which is a worm gear, is engaged with second gear 52. Rack gear 54 is engaged with third gear 53.

When motor 50 rotates, rack gear 54 moves in the horizontal direction by the rotational force transmitted to third gear 53. Rack gear 54 is a gear for driving lock portion 55.

Lock portion 55 is a member for limiting (locking) the movement of forward/backward movement member 30 in the forward and backward direction. A mechanism of converting the linear motion of rack gear 54 into a rotational motion can be exemplified in the structure of lock portion 55.

The locked state is a state in which forward/backward movement member 30 is held and forward movement of forward/backward movement member 30 is limited when forward/backward movement member 30 is at the backward position.

For example, when motor 50 rotates and rack gear 54 moves toward cam 41, lock portion 55 driven by rack gear 54 is engaged with a fitting hole formed in cam 41 at the locked position of forward/backward movement member 30. Thus, forward/backward movement member 30 is in the locked state.

In the locked state, when motor 50 reversely rotates and rack gear 54 moves to the side opposite to the direction toward cam 41, lock portion 55 is extracted from the fitting hole formed in cam 41. Thus, forward/backward movement member 30 is in the unlocked state.

Cable 60 is a wire for forcibly setting the unlocked state regardless of the rotation of motor 50. For example, when the operation of extracting cable 60 is performed, lock portion 55 can be forcibly moved, and thus forward/backward movement member 30 is in the unlocked state. Then, the fuel lid can be forcibly opened.

Next, an operation of forward/backward movement device 1 will be described. When forward/backward movement member 30 is at the forward position, latching section 32 of forward/backward movement member 30 is an unlatched state from the latched section of the fuel lid. At this time, lock portion 55 is placed at a position where the locking state is released.

When the fuel lid is closed in this state, forward/backward movement member 30 pushed by the fuel lid is guided by protrusion 22 of guide member 20 with protrusion 22 sliding onto groove 33 of forward/backward movement member 30, and forward/backward movement member 30 rotates and moves backward. At this time, spring 42 connected to cam 41 is compressed by cam 41 holding forward/backward movement member 30.

Further, the rotation of forward/backward movement member 30 sets the rotational angle of latching section 32 from the first angle to the second angle, and then latching section 32 is latched to the latched section of the fuel lid.

When forward/backward movement member 30 moves to the backward position and reaches the locked position, motor 50 rotates, rack gear 54 moves toward cam 41, and lock portion 55 engages with the fitting hole formed in cam 41.

Thus, forward/backward movement member 30 is held so as not to move forward, and the fuel lid is in the closed state (e.g., a state where the filler port of the vehicle is closed).

Further, when motor 50 reversely rotates at the locked position of forward/backward movement member 30, rack gear 54 moves in the direction opposite to the direction toward cam 41, and the engagement state between lock portion 55 and cam 41 is released, so that the limitation on the forward and backward movement of forward/backward movement member 30 and cam 41 is released.

Note that the limitation on the forward and backward movement of forward/backward movement member 30 can also be released by the operation of cable 60. Pulling cable 60 allows lock portion 55 to operate against the restraining force by the engagement between rack gear 54 and third gear 53, and thus lock portion 55 is separated from cam 41. This also releases the limitation on the forward and backward movement of forward/backward movement member 30 and cam 41.

When the limitation on the forward and backward movement of forward/backward movement member 30 and cam 41 is released, forward/backward movement member 30 moves to the forward position with cam 41 by the repulsive force of spring 42. At this time, forward/backward movement member 30 rotates and moves forward, and the rotation angle of latching section 32 is set from the second angle to the first angle. Thus, latching section 32 of forward/backward movement member 30 is in the unlatched state from the latched section of the fuel lid, and the fuel lid is in the opened state.

In the forward/backward movement member applied to the conventional forward/backward movement device, a helical groove is formed in an area that is adjacent to the forward/backward movement member-side member (corresponding to cam 41 in this embodiment) and is not exposed to the outside of the case within the outer peripheral surface of the forward/backward movement member, but no helical groove is formed in the area exposed to the outside of the case to prevent intrusion of water. Therefore, intrusion of water from the outside of the case into the inside of the case can be prevented.

However, the length of the forward/backward movement member applied to the conventional forward/backward movement device is the length resulting from addition of the area where the helical groove is not formed and the area where the helical groove is formed in the extending direction. The longer the forward/backward movement member is, the more difficult the miniaturization of the forward/backward movement device is.

On the other hand, in forward/backward movement device 1 according to the embodiment of the present invention, groove 33 having a helical shape is formed on the inner peripheral surface of forward/backward movement member 30, which allows the rotation movement of forward/backward movement member 30 and can eliminate the water intrusion path while the entire length of forward/backward movement member 30 is shortened. Therefore, forward/backward movement device 1 capable of being miniaturized while preventing the intrusion of water can be obtained.

Note that an exemplary configuration of forward/backward movement member 30 in which groove 33 having a helical shape is formed on the inner peripheral surface has been described in the embodiment of the present invention, but forward/backward movement member 30 can be configured as described below.

[Variation of Forward/Backward Movement Member 30]

Figure 5:
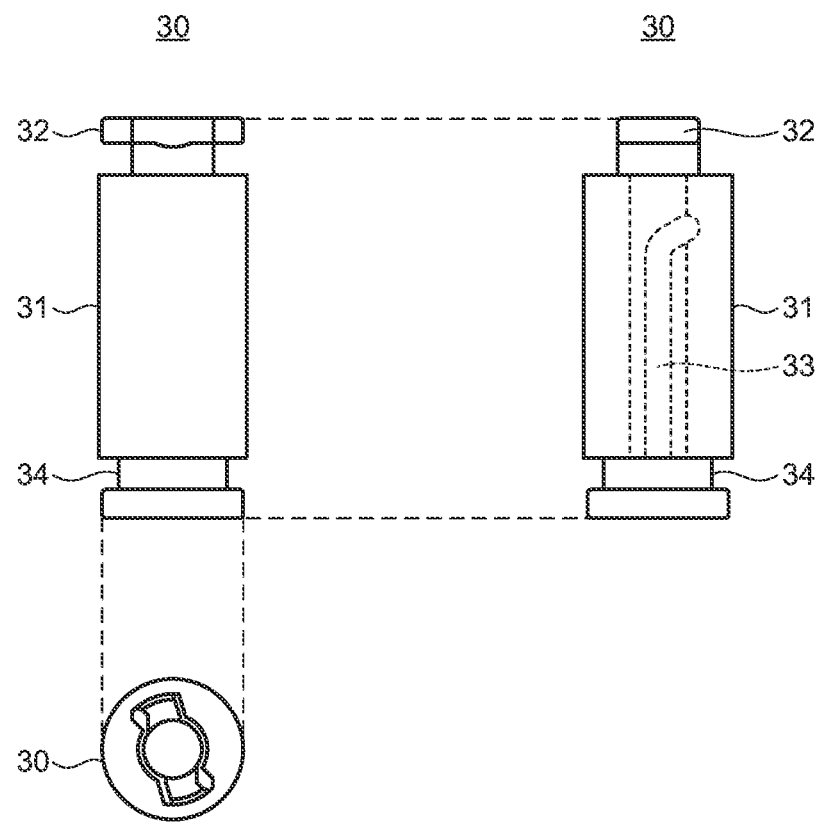
FIG. 5 is a diagram for describing an exemplary variation of forward/backward movement member 30.

FIG. 5 is a diagram for describing an exemplary variation of forward/backward movement member 30. A diagram of FIG. 5 on the left side is a diagram of forward/backward movement member 30 viewed from the side, a diagram of FIG. 5 on the right side is a diagram of forward/backward movement member 30 viewed from the front, and a diagram of FIG. 5 on the lower side is a diagram of forward/backward movement member 30 viewed from the lower end. Forward/backward movement member 30 in FIG. 5 includes groove 33 that linearly extends along the axial direction of body 31 of forward/backward movement member 30 from the lower end of body 31 to the vicinity of the upper end of body 31 and inclines at a predetermined angle (e.g., 45°) with respect to the axial direction of body 31.

Note that, as an exemplary variation of forward/backward movement member 30, forward/backward movement member 30 may include groove 33 that linearly extends along the axial direction of body 31 of forward/backward movement member 30 from the upper end of body 31 to the vicinity of the lower end of body 31 and inclines at a predetermined angle (e.g., 45°) with respect to the axial direction of body 31.

In addition to the above-described effect, providing such groove 33 can reduce sliding friction between protrusion 22 of guide member 20 and the groove. Application of groove 33 having a helical shape allows easy processing of forward/backward movement member 30 using a tap in which a protrusion having a helical shape is formed, and thus increase in the manufacturing cost of forward/backward movement member 30 can be suppressed. Note that it is preferred that groove 33 described in FIG. 5 be a groove having a shape that extends from the lower end (one end) of body 31 to the position reaching the upper end (the other end). This can shorten the entire length of forward/backward movement member 30 exposed from seal cover 11 of case 10 when forward/backward movement member 30 moves backward.

Further, the exemplary configuration of guide member 20 in which two protrusions 22 are formed has been described in the embodiment of the present invention, but the number of protrusions 22 may be one, three, or more. However, setting the number of protrusions 22 to two can cause forward/backward movement member 30 to stably move forward and backward while the central axis of guide member 20 and the central axis of forward/backward movement member 30 are held coaxially. Therefore, increase in the manufacturing cost of guide member 20 can be further suppressed.

Note that forward/backward movement device 1 of the embodiment of the present invention is not limited to the device for opening and closing a fuel lid, and can be used as a device that controls the operation of an opening-and-closing-body performing opening and closing operation, such as an opening and closing device for an opening of a charge lid in which a charging port of a vehicle having the charging port is housed.

Note that, for example, the following aspects are also understood to fall within the technical scope of the present disclosure.

(1) A forward/backward movement device includes: a case; a guide member that is housed in the case and includes a shaft and a protrusion formed on an outer peripheral surface of the shaft; and a forward/backward movement member having a cylindrical shape, the forward/backward movement member including a groove that is formed on an inner peripheral surface of the forward/backward movement member and moving forward and backward with respect to the case while rotating by being guided by the protrusion, the groove being a portion where the protrusion slides.

(2) A plurality of the protrusions are formed on the shaft.

(3) The plurality of protrusions are disposed to be line-symmetric with respect to a central axis of the shaft.

(4) The protrusion includes an inclined surface parallel to an inner peripheral surface forming the groove therein.

(5) The groove is a groove having a helical shape and extending from one end of the forward/backward movement member toward another end thereof.

(6) The groove is a groove having a shape extending from one end of the forward/backward movement member to a position reaching another end thereof.

It should be understood that the embodiment disclosed herein are illustrative and non-restrictive in all respects. It is intended that the scope of the invention be defined by the appended claims rather than the above description, and that all changes within the meaning and range of equivalency of the claims be included in the claims.

The embodiment of the present invention has been described above. It should be noted that the above description is illustrative of a preferred embodiment of the present invention, and the scope of the present invention is not limited thereto. That is, the configuration of the device and the shape of each part are merely an example, and it is obvious that various modifications and additions to these examples are possible within the scope of the present invention.

INDUSTRIAL APPLICABILITY

The forward/backward movement device according to the present invention is useful as a device capable of being miniaturized while preventing intrusion of water.

REFERENCE SIGNS LIST

1 Forward/backward movement device
10 Case
11 Seal cover
12 Screw guide
20 Guide member
21 Shaft
21a Outer peripheral surface
21b Central axis
22 Protrusion
22a Inclined surface
23 Fixing member
23a Groove
30 Forward/backward movement member
31 Body
32 Latching section
33 Groove
34 Groove
41 Cam
42 Spring
43 Spring plate
44 Guide pin
50 Motor
51 First gear
52 Second gear
53 Third gear
54 Rack gear
55 Lock portion
60 Cable

What is claim is:

1. A forward/backward movement device comprising:
a case provided with a through hole;
a guide member that is housed and fixed in the case and includes a shaft and a protrusion formed on an outer peripheral surface of the shaft;
a forward/backward movement member having a cylindrical shape body which includes a groove formed on an inner peripheral surface of the cylindrical body, in which the shaft is inserted and the protrusion is slidably fitted into the groove, a first end side of the forward/backward movement member being provided with a latch and being exposed to an outside, a second end side of the forward/backward movement member being inserted in the through hole in a state where the second end side is positioned inside of the case, and which is configured to move forward and backward with respect to the case while rotating by being guided by the protrusion;
a seal cover disposed to encircle the though hole to close a gap between the case and the forward/backward movement member;
a cam which is disposed at an outer peripheral side of the forward/backward movement member inside of the case without being exposed to the outside and which is configured to rotatably hold the forward/backward movement member and move forward and backward together with the forward/backward movement member; and a spring disposed inside of the case to connect with the cam and configured such that, when the spring extends, the spring pushes the cam to move the forward/backward movement member forward via the cam, and, when the forward/backward movement member moves backward, the spring is compressed by the forward/backward movement member via the cam.

2. The forward/backward movement device according to claim 1, wherein
a plurality of the protrusions are formed on the shaft.

3. The forward/backward movement device according to claim 2, wherein
the plurality of protrusions are disposed to be line-symmetric with respect to a central axis of the shaft.

4. The forward/backward movement device according to claim 1, wherein
the protrusion includes an inclined surface parallel to an inner peripheral surface forming the groove therein.

5. The forward/backward movement device according to claim 1, wherein
the groove is a groove having a helical shape and extending from one end of the forward/backward movement member toward another end thereof.

6. The forward/backward movement device according to claim 1, wherein
the groove is a groove having a shape extending from one end of the forward/backward movement member to a position reaching another end thereof.

* * * * *